United States Patent
Chen

(10) Patent No.: US 12,306,038 B2
(45) Date of Patent: May 20, 2025

(54) SMART SPEAKER AND SOUND EFFECT CONTROL METHOD USING THE SAME

(71) Applicant: Acer Incorporated, New Taipei (TW)

(72) Inventor: Tsung-Mao Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 18/632,992

(22) Filed: Apr. 11, 2024

(65) Prior Publication Data
US 2025/0044149 A1   Feb. 6, 2025

(30) Foreign Application Priority Data
Aug. 2, 2023   (TW) ................... 112129066

(51) Int. Cl.
  *G01J 1/42*   (2006.01)
  *H04S 7/00*   (2006.01)
(52) U.S. Cl.
  CPC ............ *G01J 1/4204* (2013.01); *H04S 7/308* (2013.01); *H04S 2400/13* (2013.01)
(58) Field of Classification Search
  None
  See application file for complete search history.

(56) References Cited

U.S. PATENT DOCUMENTS

| 2007/0086624 | A1  | 4/2007 | Breed et al. |
| 2023/0022327 | A1* | 1/2023 | Chen ................. H04R 1/1025 |
| 2024/0077991 | A1* | 3/2024 | Von Hagen ......... G06F 3/03547 |
| 2024/0247978 | A1* | 7/2024 | Jia ........................... G09G 3/36 |

FOREIGN PATENT DOCUMENTS

| CN | 111179957 A | 5/2020 |
| CN | 111936833 A | 11/2020 |
| JP | 2021-190827 A | 12/2021 |
| TW | M508120 U | 9/2015 |

OTHER PUBLICATIONS

Taiwanese Office Action and Search Report for Taiwanese Application No. 112129066, dated Apr. 18, 2024.

* cited by examiner

*Primary Examiner* — Christopher J Kohlman
(74) *Attorney, Agent, or Firm* — Birch, Stewart, Kolasch & Birch, LLP

(57) ABSTRACT

A smart speaker including a first light sensor, a second light sensor, a loudspeaker and a processor is provided. The first light sensor is configured to sense the first ambient light brightness value. The second light sensor is configured to sense the second ambient light brightness value. The loudspeaker is configured to emit a sound. The processor is electrically connected to the first light sensor, the second light sensor and the loudspeaker, and is configured to control a sound effect of the sound according to the first ambient light brightness value and the second ambient light brightness value.

10 Claims, 3 Drawing Sheets

SMART SPEAKER AND SOUND EFFECT CONTROL METHOD USING THE SAME

This application claims the benefit of Taiwan application Ser. No. 112129066, filed Aug. 2, 2023, the subject matter of which is incorporated herein by reference.

BACKGROUND OF THE INVENTION

Field of the Invention

The present disclosure relates in general to a smart speaker and a sound effect control method using the same.

Description of the Related Art

Speaker box can be controlled to emit a sound. In terms of control, most conventional speakers are manually controlled to play predetermined music or sound effect. However, applications of such speaker box are limited. Therefore, it has become one of the prominent tasks for the industries to expand the application areas of the speaker box.

SUMMARY OF THE INVENTION

The present disclosure is directed to a smart speaker and a sound effect control method using the same capable of resolving the problems disclosed above.

According to an embodiment of the present disclosure, a smart speaker is provided. The smart speaker includes a first light sensor, a second light sensor, a loudspeaker and a processor. The first light sensor is configured to sense a first ambient light brightness value. The second light sensor is configured to sense a second ambient light brightness value. The loudspeaker is configured to emit a sound. The processor is electrically connected to the first light sensor, the second light sensor and the loudspeaker, and is configured to control a sound effect of the sound according to the first ambient light brightness value and the second ambient light brightness value.

According to another embodiment of the present disclosure, a sound effect control method is provided. The sound effect control method includes the following steps: sensing a first ambient light brightness value by a first light sensor; sensing a second ambient light brightness value by a second light sensor; and, controlling a sound effect of a sound emitted from a loudspeaker by a processor according to the first ambient light brightness value and the second ambient light brightness value.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

Figure 1:
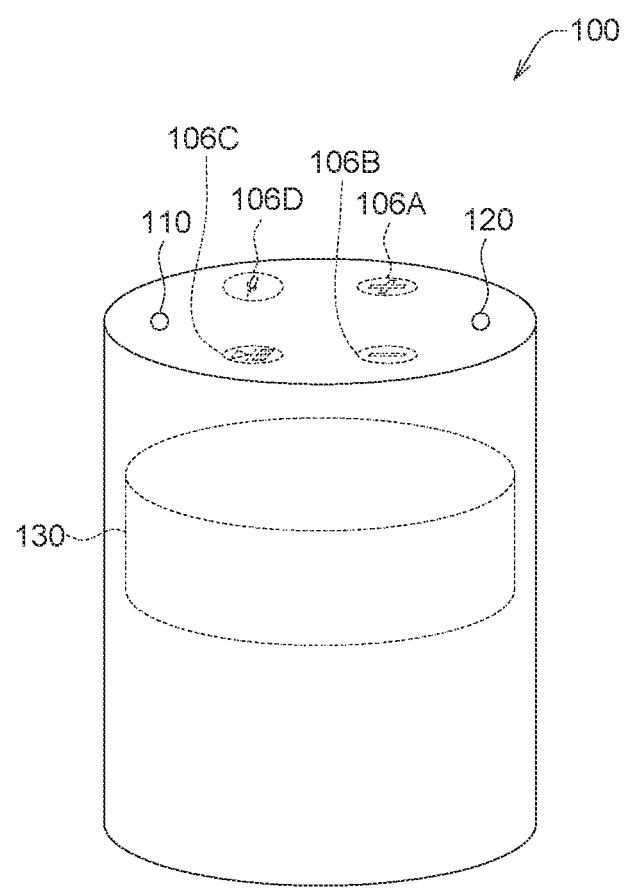
FIG. 1 is an external view of a smart speaker according to an embodiment of the present disclosure.
Figure 2:
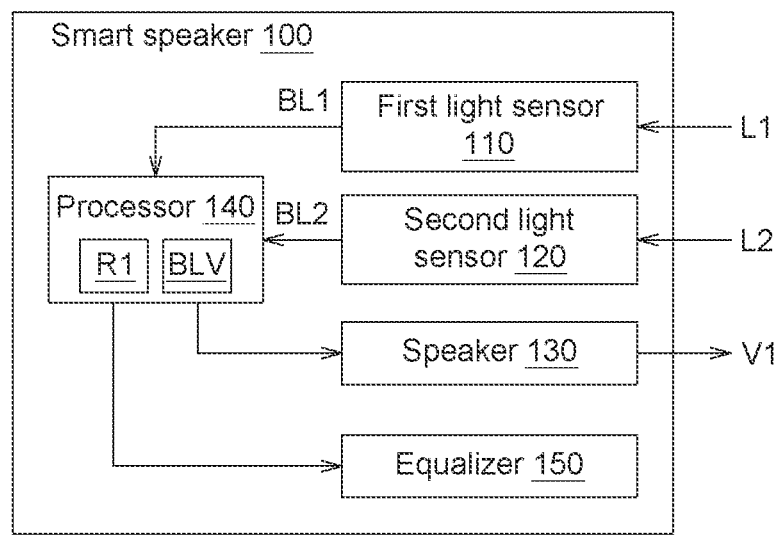
FIG. 2 is a function block diagram of the smart speaker of FIG. 1.
Figure 3:
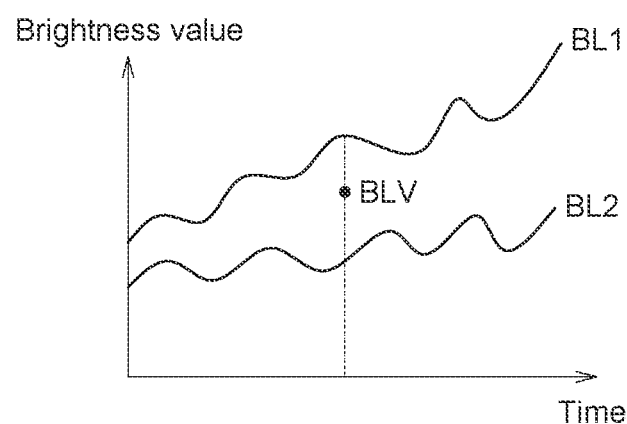
FIG. 3 is a trend chart of the first ambient light brightness value and the second ambient light brightness value of FIG. 2.
Figure 4:
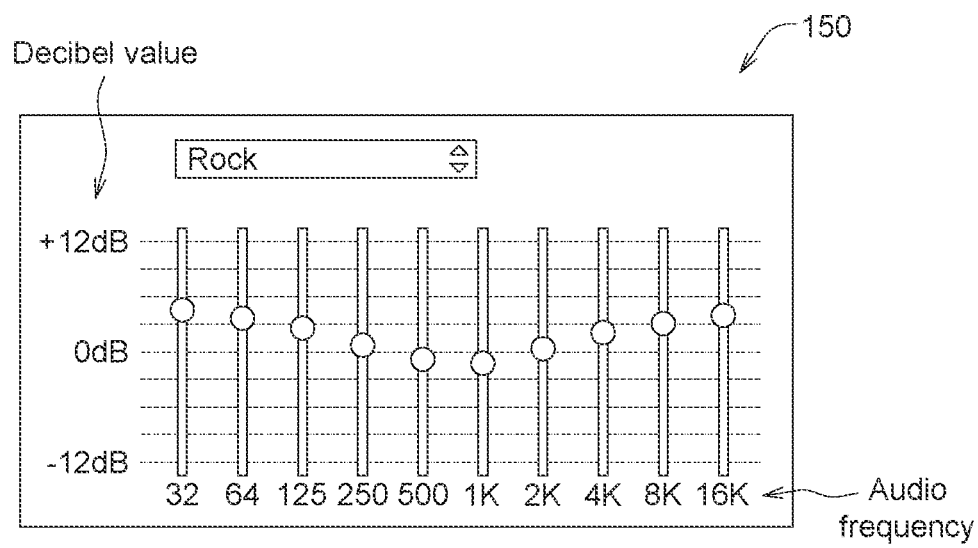
FIG. 4 is a schematic diagram of an equalizer according to an embodiment of the present disclosure.

Refer to FIGS. 1 to 4. FIG. 1 is an external view of a smart speaker 100 according to an embodiment of the present disclosure. FIG. 2 is a function block diagram of the smart speaker 100 of FIG. 1. FIG. 3 is a trend chart of the first ambient light brightness value BL1 and the second ambient light brightness value BL2 of FIG. 2. FIG. 4 is a schematic diagram of an equalizer 150 according to an embodiment of the present disclosure.

As indicated in FIG. 1, the smart speaker 100 includes a housing 105, a first light sensor 110, a second light sensor 120, a loudspeaker 130 and a processor 140. Although it is not illustrated in the diagram, the smart speaker 100 further includes an amplifier connecting the processor 140 and the loudspeaker 130 for amplifying the signal transmitted to the loudspeaker 130.

The first light sensor 110 is configured to sense the first ambient light brightness value BL1. The second light sensor 120 is configured to sense the second ambient light brightness value BL2. The loudspeaker 130 is configured to emit a sound V1. The processor 140 is electrically connected to the first light sensor 110, the second light sensor 120 and the loudspeaker 130, and is configured to control the sound effect of the sound V1 according to the first ambient light brightness value BL1 and the second ambient light brightness value BL2. Thus, the smart speaker 100 emits a corresponding sound effect of the sound V1 according to the ambient light brightness value or automatically (initiatively) adjust the emitted sound effect of the sound V1 according to the changes in the ambient light brightness value.

As indicated in FIG. 1, the first light sensor 110, the second light sensor 120, the loudspeaker 130 and the processor 140 are arranged on the housing 105. The first light sensor 110 and the second light sensor 120 are exposed from the housing 105 for the convenience of sensing the first ambient light L1 and the second ambient light L2. The first ambient light brightness value BL1 is a brightness value of the first ambient light L1; the second ambient light brightness value BL2 is a brightness value of the second ambient light L2. The first ambient light L1 and the second ambient light L2 respectively enter the first light sensor 110 and the second light sensor 120 from different directions in the environment. By sensing several rays of ambient light, the accuracy of determining the ambient mode is increased. In comparison to one ambient light brightness value, the difference between two ambient light brightness values provides an additional determination reference for the determination of ambient mode. For instance, one among the ambient light brightness value can be used as a reference and individual difference between each of the remaining ambient light brightness values and the reference provide can be used as an additional reference for the determination of ambient mode.

As indicated in FIGS. 1 and 2, the smart speaker 100 further includes a volume up key 106A, a volume down key 106B, a start/pause key 106C, a mute/amplifier key 106D, wherein these kays can be arranged on the control panel of the smart speaker 100. Besides, the first light sensor 110 and the second light sensor 120 can also be arranged on the control panel.

As indicated in FIGS. 1 and 2, the processor 140 is further configured to obtain a comprehensive ambient light gain value (or comprehensive ambient light brightness value) BLV according to the first ambient light brightness value BL1 and the second ambient light brightness value BL2; and is configured to control the sound effect of the sound V1 according to the comprehensive ambient light gain value BLV. Besides, the processor 140 can be realized by such as a system on a chip (SoC).

In Table 1, a correspondence relationship R1 between the comprehensive ambient light gain values BLV and the sound effect modes VM is listed. The processor 140 is further configured to: obtain a sound effect mode VM of one of the comprehensive ambient light gain values BLV according to the correspondence relationship R1; and, control the sound effect of the sound V1 according to the obtained sound effect mode VM. For instance, when the comprehensive ambient light gain value BLV obtained by the processor 140 has a luminance of 100, the processor 140 adjusts the sound effect of the sound V1 to sleep mode. Different sound effect modes VM can correspond to different comprehensive ambient light gain values BLV.

TABLE 1

| Sound effect mode VM | Comprehensive ambient light gain value BLV (luminance) |
| --- | --- |
| Sleep mode | 100 |
| Comfort mode | 600 |
| Outdoor mode | 1000 |
| Live mode | 650 |
| Vocal mode | 500 |
| Rock mode | 800 |

The correspondence relationship R1 can be obtained in advance by way of software simulation or site simulation. After the correspondence relationship R1 is obtained, the correspondence relationship R1 can be pre-stored in the processor 140 or pre-stored in a memory electrically connected to the processor 140 for the processor 140 to access.

As indicated in FIG. 3, during the simulation process of a sound effect mode, the first ambient light brightness value BL1 and the second ambient light brightness value BL2 vary with time, and the comprehensive ambient light gain value BLV can be obtained from the trend of the first ambient light brightness value BL1 and the second ambient light brightness value BL2. In an embodiment, the processor 140 obtains an average value (weight) of the first ambient light brightness value BL1 and the second ambient light brightness value BL2; and, uses the average brightness value as the comprehensive ambient light gain value BLV. The average brightness value is an average brightness value (such as an average of sums or differences) of the first ambient light brightness value BL1 and the second ambient light brightness value BL2 obtained at least one time point or several average brightness values (such as several averages of sums or differences) of several first ambient light brightness values BL1 and several second ambient light brightness values BL2 obtained at several time points. Besides, the method for obtaining the comprehensive ambient light gain value BLV is not limited to averaging the brightness values; it can also be obtained by way of other statistical methods, algorithms, or mathematical methods. In an embodiment, the comprehensive ambient light gain value BLV can be obtained according to the ratio of the first ambient light brightness value BL1 to the second ambient light brightness value BL2. Or, the comprehensive ambient light gain value BLV can be obtained according to the incident angle at which the first ambient light L1 enters the first light sensor 110 and/or the incident angle at which the second ambient light L2 enters the second light sensor 120.

As indicated in FIG. 4, the sound effect mode VM contains several audio frequencies and a plurality of decibel values corresponding to the audio frequencies. The processor 140 is further configured to: load (or execute) an equalizer 150; and, input the audio frequencies and the decibel values to the equalizer 150, so that the sound V1 is provided with a sound effect. Different sound effect modes VM are provided with different correspondence relationships of audio frequencies. In the present embodiment, the equalizer 150 can be realized by such as an application program.

Figure 5:
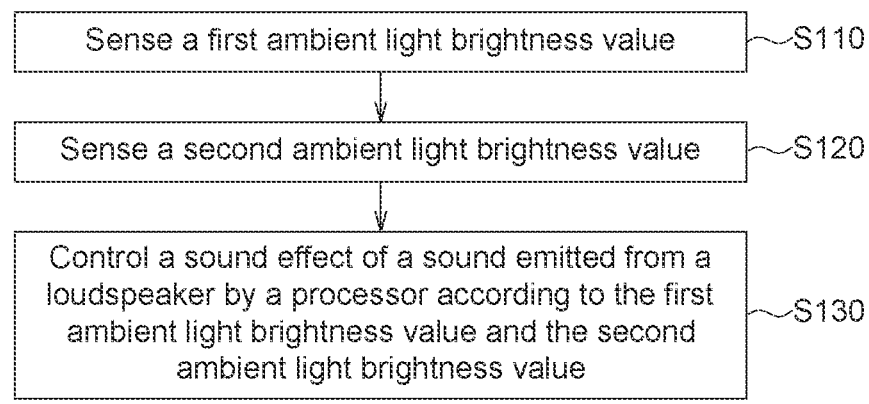
FIG. 5 is a flowchart of a sound effect control method of the smart speaker of FIG. 1.

Referring to FIG. 5, a flowchart of a sound effect control method of the smart speaker 100 of FIG. 1 is shown.

In step S110, the first ambient light brightness value BL1 is sensed by the first light sensor 110.

In step S120, the second ambient light brightness value BL2 is sensed by the second light sensor 120.

In step S130, the sound effect of the sound V1 emitted from the loudspeaker 130 is controlled by the processor 140 according to the first ambient light brightness value BL1 and the second ambient light brightness value BL2.

Remaining steps of the sound effect control method are already disclosed above and are not repeated here.

To summarize, a smart speaker and a sound effect control method using the same are provided in above embodiments of the present disclosure. The smart speaker can sense the ambient light brightness and its changes and can correspondingly adjust the sound effect of the sound emitted from a loudspeaker.

While the disclosure has been described by way of example and in terms of the preferred embodiment(s), it is to be understood that the disclosure is not limited thereto. Based on the technical features embodiments of the present disclosure, a person ordinarily skilled in the art will be able to make various modifications and similar arrangements and procedures without breaching the spirit and scope of protection of the disclosure. Therefore, the scope of protection of the present disclosure should be accorded with what is defined in the appended claims.

What is claimed is:

1. A smart speaker, comprising:
    a first light sensor configured to sense a first ambient light brightness value;
    a second light sensor configured to sense a second ambient light brightness value;
    a loudspeaker configured to emit a sound; and
    a processor electrically connected to the first light sensor, the second light sensor and the loudspeaker, and configured to control a sound effect of the sound according to the first ambient light brightness value and the second ambient light brightness value.

2. The smart speaker according to claim 1, wherein the processor is further configured to:
    obtain a comprehensive ambient light gain value according to the first ambient light brightness value and the second ambient light brightness value; and
    control the sound effect of the sound according to the comprehensive ambient light gain value.

3. The smart speaker according to claim 1, further comprising a correspondence relationship between a plurality of comprehensive ambient light gain values and a plurality of sound effect modes; the processor is further configured to:
    obtain the sound effect mode corresponding to one of the comprehensive ambient light gain values from the correspondence relationship; and control the sound effect of the sound according to the obtained sound effect mode.

4. The smart speaker according to claim 3, wherein the sound effect mode comprises a plurality of audio frequencies and a plurality of decibel values corresponding to the audio frequencies; the processor is further configured to:
    load an equalizer; and
    input the audio frequencies and the decibel values to the equalizer, so that the sound is provided with the sound effect.

5. The smart speaker according to claim 1, wherein the processor is further configured to:
    obtain an average brightness value of the first ambient light brightness value and the second ambient light brightness value; and
    control the sound effect of the sound according to the average brightness value.

6. A sound effect control method, comprising:
    sensing a first ambient light brightness value by a first light sensor;
    sensing a second ambient light brightness value by a second light sensor; and,
    controlling a sound effect of a sound emitted from a loudspeaker by a processor according to the first ambient light brightness value and the second ambient light brightness value.

7. The sound effect control method according to claim 6, further comprising:
    obtaining a comprehensive ambient light gain value according to the first ambient light brightness value and the second ambient light brightness value; and
    controlling the sound effect of the sound according to the comprehensive ambient light gain value.

8. The sound effect control method according to claim 6, further comprising:
    from a correspondence relationship between a plurality of comprehensive ambient light gain values and a plurality of sound effect modes, obtaining the sound effect mode corresponding to one of the comprehensive ambient light gain values; and
    controlling the sound effect of the sound according to the obtained sound effect mode.

9. The sound effect control method according to claim 8, wherein the sound effect mode comprises a plurality of audio frequencies and a plurality of decibel values corresponding to the audio frequencies; the sound effect control method further comprising:
    loading an equalizer; and
    inputting the audio frequencies and the decibel values to the equalizer, so that the sound is provided with the sound effect.

10. The sound effect control method according to claim 6, further comprising:
    obtaining an average brightness value of the first ambient light brightness value and the second ambient light brightness value; and
    controlling the sound effect of the sound according to the average brightness value.

* * * * *